United States Patent [19]
Segler et al.

[11] Patent Number: 5,949,324
[45] Date of Patent: Sep. 7, 1999

[54] TEMPERATURE RESPONSIVE PROBE APPARATUS

[76] Inventors: John M. Segler, 1010 Pass-A-Grille Way #3, St. Pete Beach, Fla. 33706; Gary L. Deppe, 5140 Vanderipe Rd., Sarasota, Fla. 34241; Richard E. Garrison, 42 Leedy Rd., Bellville, Ohio 44813

[21] Appl. No.: 08/999,503

[22] Filed: Dec. 29, 1997

[51] Int. Cl.⁶ ..................................................... H01C 3/04
[52] U.S. Cl. .............................. 338/28; 338/22 R; 338/25
[58] Field of Search .................... 338/22 R, 25, 338/28, 229, 234, 236

[56] References Cited

U.S. PATENT DOCUMENTS

| | | |
|---|---|---|
| 2,798,893 | 7/1957 | Winkler . |
| 2,849,518 | 8/1958 | MacDonald . |
| 3,061,806 | 10/1962 | Stevens . |
| 3,186,227 | 6/1965 | Barlow . |
| 3,221,555 | 12/1965 | Biber . |
| 4,243,968 | 1/1981 | Scott . |
| 4,246,787 | 1/1981 | Harper . |
| 4,318,073 | 3/1982 | Rossler, Jr. . |
| 4,333,067 | 6/1982 | Kugimiya et al. .......................... 338/34 |
| 4,420,738 | 12/1983 | Rehmann et al. . |
| 4,453,835 | 6/1984 | Clawson et al. . |
| 4,454,370 | 6/1984 | Voznick . |
| 4,485,263 | 11/1984 | Itoyama et al. . |
| 4,575,705 | 3/1986 | Gotcher . |
| 4,587,931 | 5/1986 | Duprez . |
| 4,622,455 | 11/1986 | Schwarzkopf ........................... 219/541 |
| 4,841,274 | 6/1989 | Yagher, Jr. et al. . |
| 4,842,419 | 6/1989 | Nietert . |
| 4,866,410 | 9/1989 | Deppe et al. .............................. 338/28 |
| 4,887,062 | 12/1989 | Bletz ....................................... 337/299 |
| 4,891,622 | 1/1990 | Llewellyn . |
| 4,959,633 | 9/1990 | Kiraly et al. ........................... 338/22 R |
| 5,046,857 | 9/1991 | Metzger et al. ........................ 374/135 |
| 5,481,240 | 1/1996 | Fukaya et al. ......................... 338/22 R |

FOREIGN PATENT DOCUMENTS

| | | |
|---|---|---|
| 0314427 | 12/1988 | Japan . |
| 2203554 | 10/1988 | United Kingdom . |

*Primary Examiner*—Lincoln Donovan
*Assistant Examiner*—Richard Lee
*Attorney, Agent, or Firm*—Lon H. Romanski

[57] ABSTRACT

A thermal probe assembly has a unitary outer shell or housing forming an open end adapted to receive an electrical connector unit and having an inboard end defining a probe portion; the outer shell or housing has deformable wall portions forming a bore; a pair of terminals with electrical conductor portions connected to a thermistor have a plastics material mounting member premolded thereon; the plastics material mounting member is slidably fit in the bore to position the thermistor within the bore and to axially locate the thermistor in spaced relationship to the inboard end of the outer shell or housing; portions of the plastics material mounting member interlock with cooperating portions of the bore to operatively lock the thermistor in place within the outer shell or housing.

29 Claims, 14 Drawing Sheets

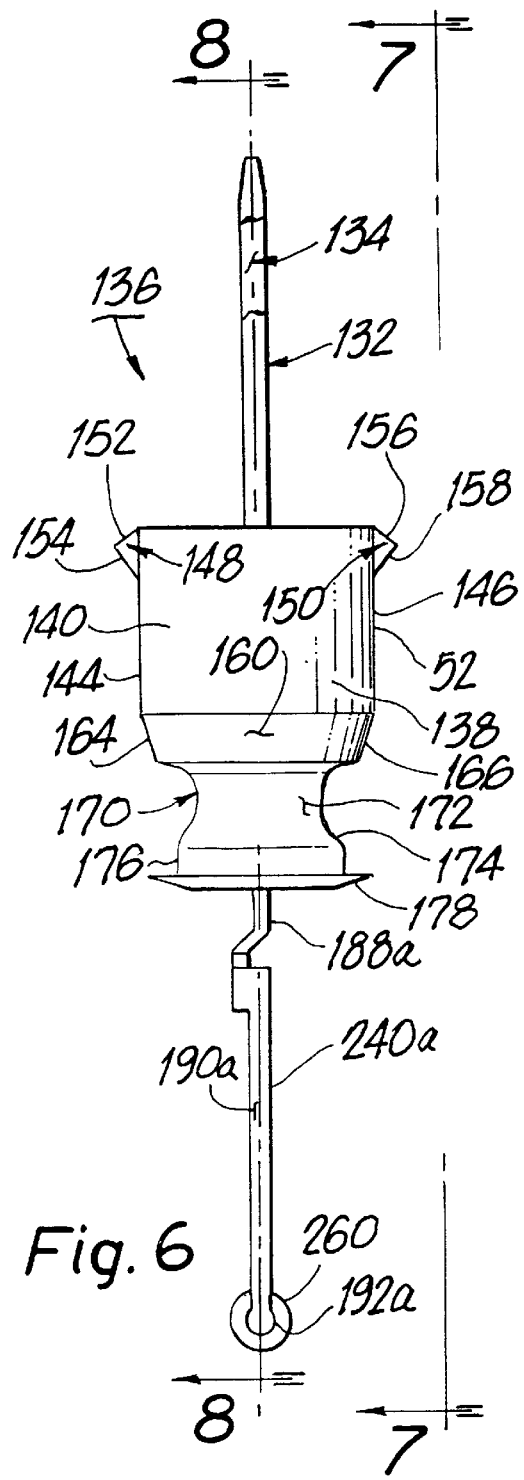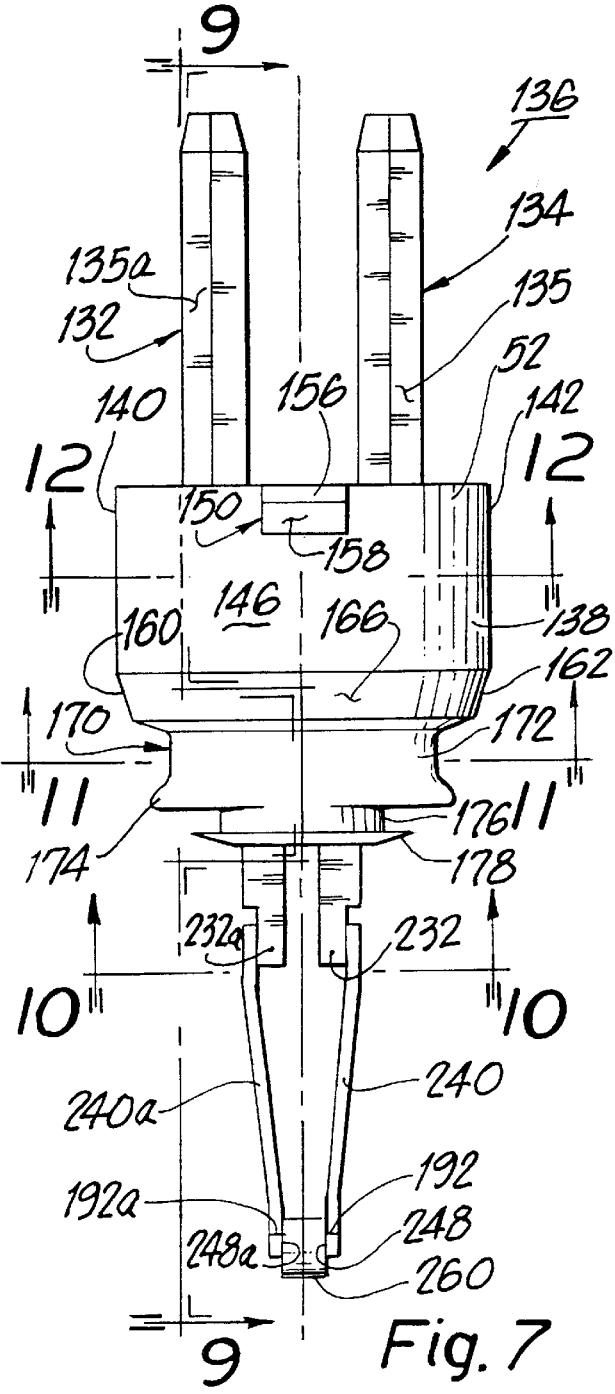

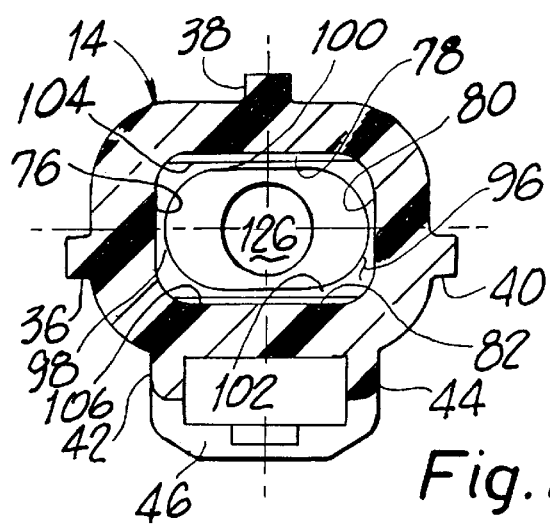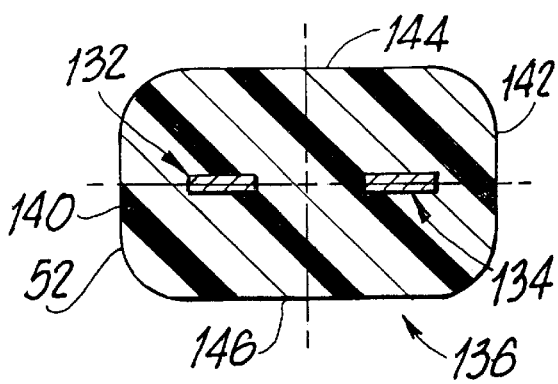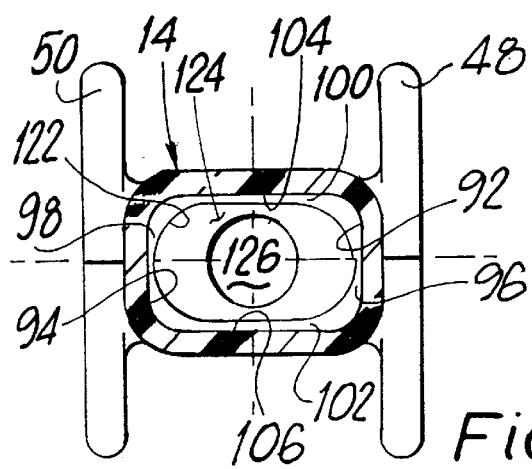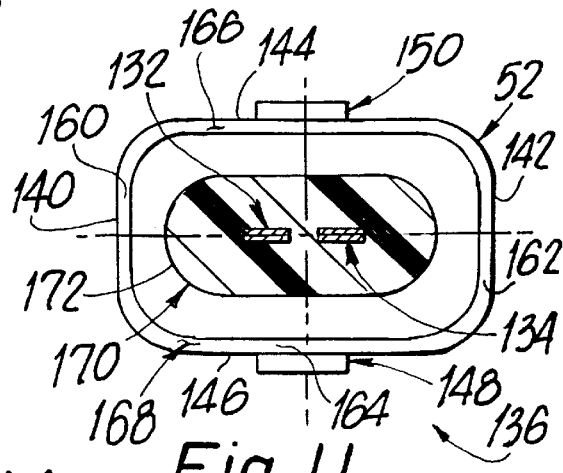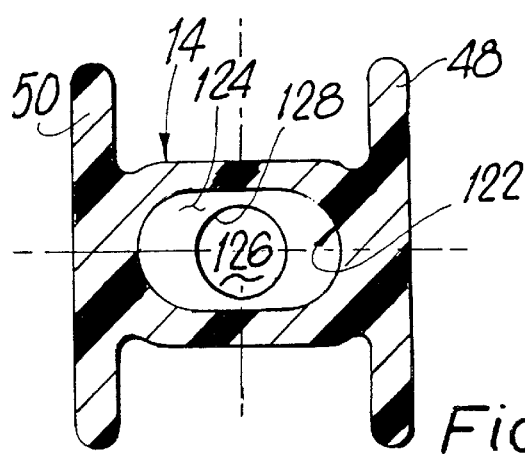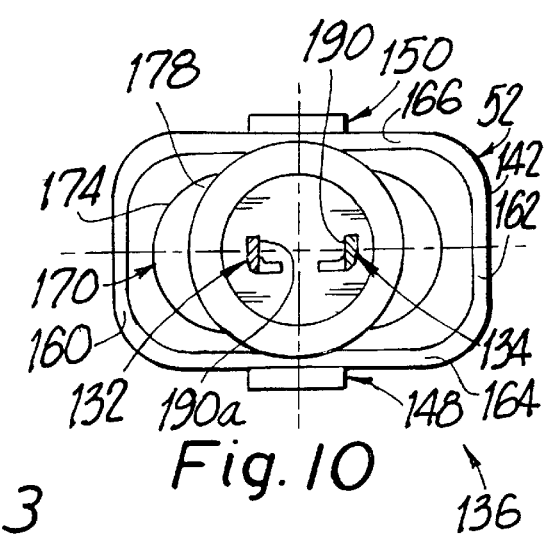

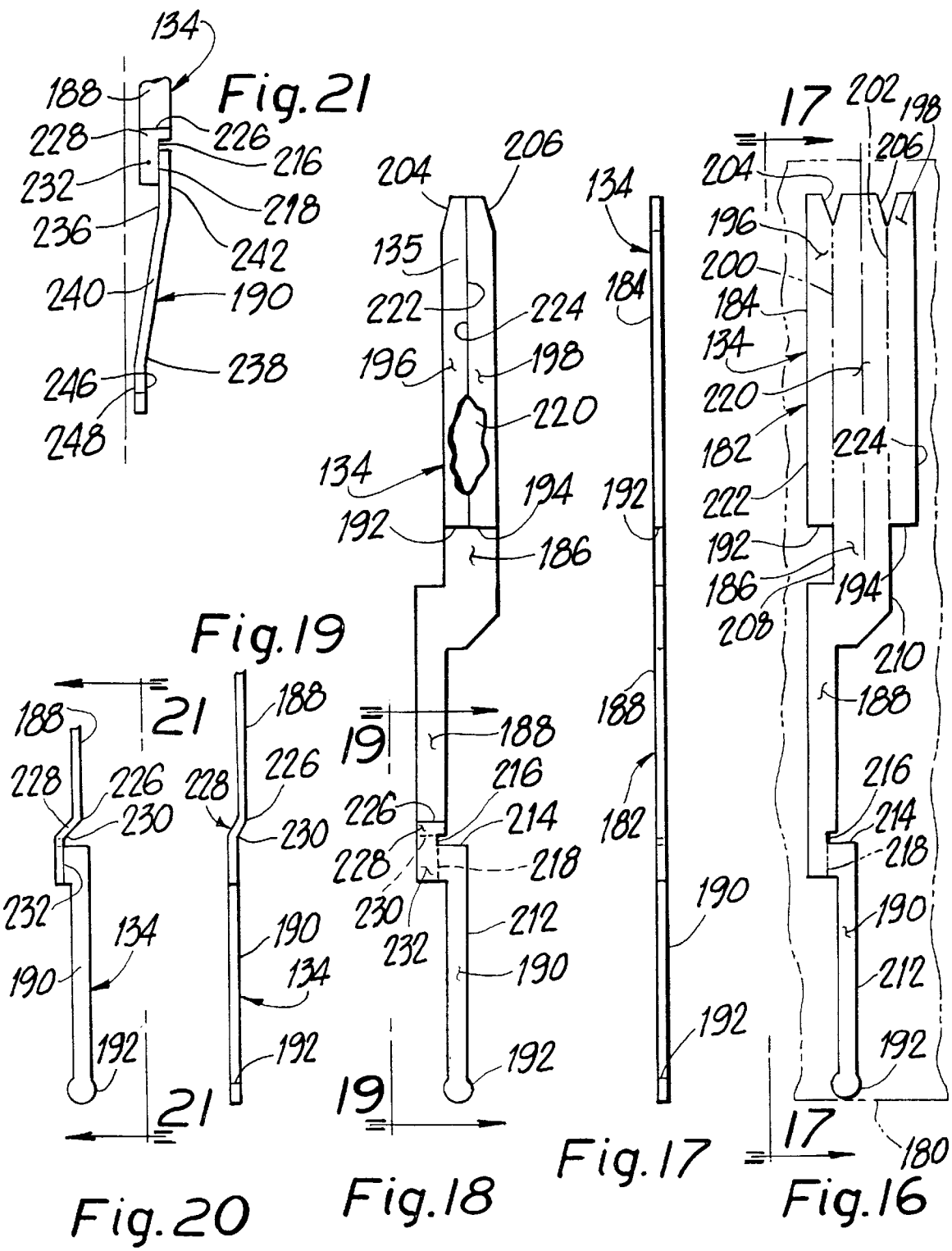

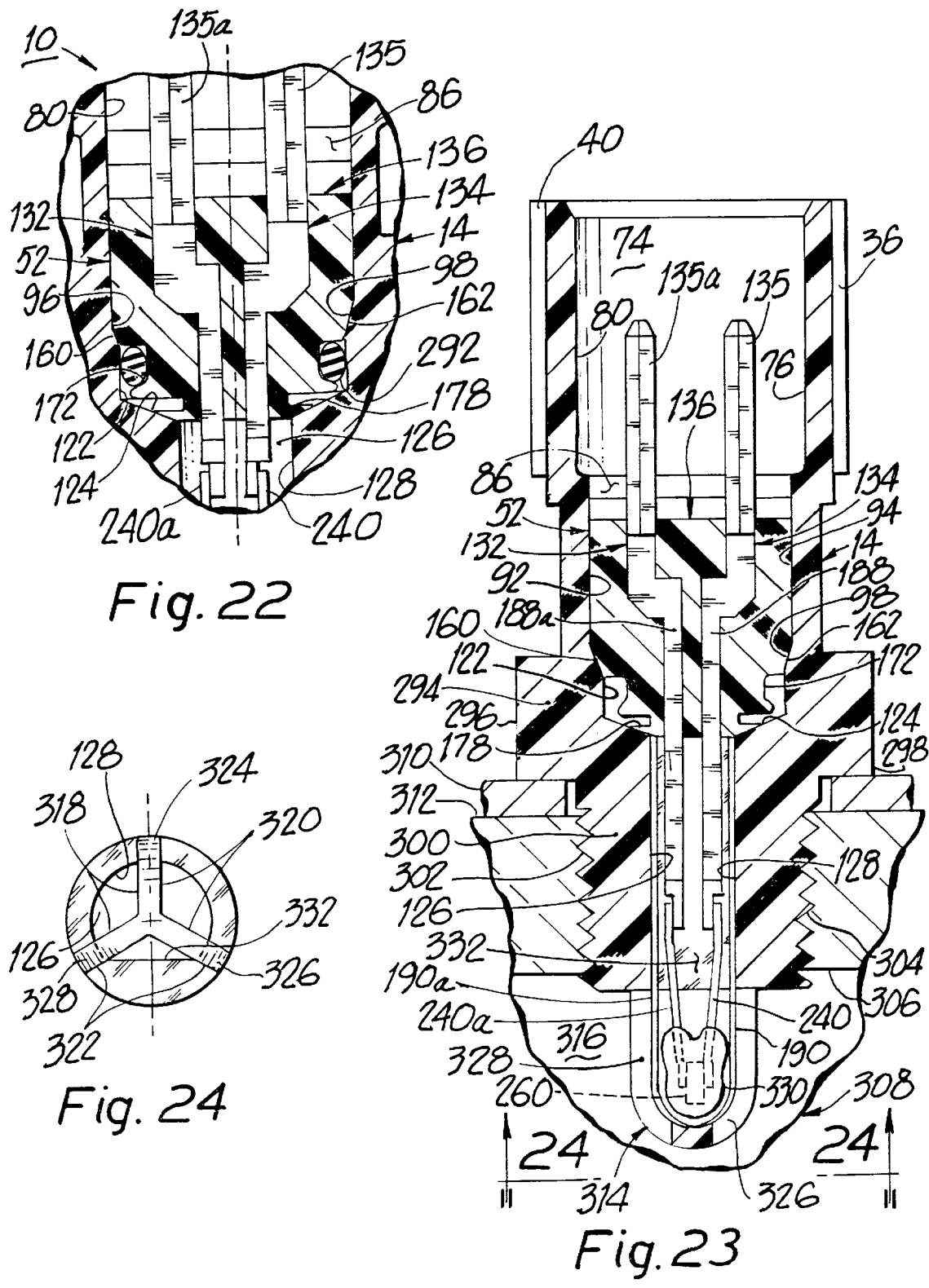

TEMPERATURE RESPONSIVE PROBE APPARATUS

FIELD OF THE INVENTION

This invention relates generally to temperature sensor assemblies and more particularly to such sensor assemblies as are effective for producing an electrical signal indicative of the sensed temperature and even more particularly to such sensor assemblies having electrical terminals, for operative connection to associated electrical circuitry, wherein such electrical terminals are joined to a temperature responding member as, for example, a thermistor.

BACKGROUND OF THE INVENTION

The prior art has provided various specific forms of thermal probe assemblies wherein, for example, a probe portion encloses a thermistor for sensing and reacting to the temperature of a medium in heat transfer relationship. In such prior art sensor assemblies, there are usually two or more electrical terminal members, as for connection to associated electrical circuitry, and electrical wire leads electrically connected as to a thermistor, or other temperature reactive means, and, basically, mechanically connected to operative ends of the electrical terminal members. Such mechanical connection is usually made as by crimping of a portion of the related electrical terminals against the respective coacting electrical wire leads. It is not unusual, in those situations, that the crimping connection is attempted to be enhanced by silver soldering or welding thereof. Examples of such means of connection are disclosed in U.S. Pat. No. 4,243,968 dated Jan. 6, 1981, with the inventor being Douglas R. Scott and U.S. Pat. No. 5,046,857 dated Sep. 10, 1991, with the inventors being John R. Metzger et al.

In prior art structures wherein, for example, a thermistor is employed as the temperature sensing means, thus wire leads of such thermistor are, in fact, the electrical wire leads which are crimped by portions of the respective cooperating terminals. For example, in the prior art as exemplified in U.S. Pat. No. 5,046,857, typically the thermistor 20 thereof is both mechanically and electrically connected to the wire leads 38—38 before any attempt of connection to the terminals 16 and 18. Once such wire leads 38—38 are connected to the thermistor 20 then such wire leads 38—38 are connected by their respective end portions 36—36 being contained in and crimped by the end portions 16c and 18c.

Even though the diametrical size of the wire leads may somewhat vary as between two different sensor assemblies of the prior art, it is not unusual to have the diameter of such wire leads be anywhere from, and including, 0.41 mm. (0.016 in.) to and including 0.51 mm. (0.020 in.).

It appears that attempts have been made in the prior art to at least reduce if not eliminate failures at the connections joining the generally cylindrical wire leads to the cooperating terminals. The prior art structures experience such failures, electrical and/or mechanical, especially when during normal use the prior art sensor assembly is exposed to vibrations or mechanical shock. When such a failure occurs the temperature sensor assembly is made non-functional and the continued successful operation of the apparatus employing the failed prior art sensor is placed at risk.

The invention as herein disclosed is primarily directed. The solution of the aforestated as well as other related and attendant problems of the prior art.

SUMMARY OF THE INVENTION

According to the invention, a temperature responsive assembly comprises housing means, passage means formed in said housing means, an internal body means adapted to be positioned within said passage means, said internal body means when so positioned within said passage means forming a chamber-like portion in said passage means, first electrical conductor means having first and second electrical conductor portions integrally formed with each other and extending through said internal body means as to have said first electrical conductor portion adapted for electrical connection to associated first electrical circuit means and as to have said second electrical conductor portion extending into said chamber-like portion and electrically connected to one electrical side of electrical resistance means which varies the magnitude of the resistance of said resistance means in response to sensed temperature, and second electrical conductor means having third and fourth electrical conductor portions integrally formed with each other and extending through said internal body means as to have said third electrical conductor portion adapted for electrical connection to associated second electrical circuit means and as to have said fourth electrical conductor portion extending into said chamber-like portion and electrically connected to a second electrical side of said electrical resistance means.

Various objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views:

FIG. 6 is a side elevational view of the inner elements of FIG. 2 of a slightly enlarged scale and in the relative position as generally depicted in FIG. 2;

FIG. 7 is an elevational view taken generally on the plane of line 7—7 of FIG. 6 and looking in the direction of the arrows;

FIG. 10 is a cross-sectional view taken generally on the plane of line 10—10 of FIG. 7 and looking in the direction of the arrows;

FIG. 11 is a cross-sectional view taken generally on the plane of line 11—11 of FIG. 7 and looking in the direction of the arrows;

FIG. 12 is a cross-sectional view taken generally on the plane of line 12—12 of FIG. 7 and looking in the direction of the arrows;

FIG. 13 is a cross-sectional view, of relatively reduced scale, taken generally on the plane of line 13—13 of FIG. 1 and looking in the direction of the arrows;

FIG. 14 is a cross-sectional view, of relatively reduced scale, taken generally on the plane of line 14—14 of FIG. 1 and looking in the direction of the arrows;

FIG. 15 is a cross-sectional view, of relatively reduced scale, taken generally on the plane of line 15—15 of FIG. 1 and looking in the direction of the arrows;

FIG. 16 is a generally plan view of a formed metal blank for, in turn, forming the continuous electrical conductor as of FIGS. 6, 7 and 8;

FIG. 17 is a side elevational view of the blank of FIG. 16 taken generally on the plane of line 17—17 of FIG. 16 and looking in the direction of the arrows;

FIG. 18 is a generally plan view of the blank, as shown in FIG. 16, further depicting the forming and bending-over of two longitudinally extending portions shown in FIG. 16;

FIG. 19 is a side elevational view, of a portion of the blank of FIG. 18, taken generally on the plane of line 19—19, looking in the direction of the arrows, and depicting a further forming and/or bending operation performed upon the blank of either FIG. 16 or 18;

FIG. 20 is an elevational view of the same portion of the blank as in FIG. 19 but further depicting an other forming operation thereon;

FIG. 21 is a view of the same fragmentary portion depicted in FIGS. 19 and 20, taken generally on the plane of line 21—21 of FIG. 20 and looking in the direction of the arrows;

FIG. 22 is a fragmentary view of the invention shown in FIG. 3 including a modification thereof;

FIG. 23 is a view similar to that of FIG. 3 and illustrating a further embodiment;

FIG. 24 is a view taken generally on the plane of line 24—24 of FIG. 23 and looking in the direction of the arrows and viewing only a portion of the structure of FIG. 23;

DETAILED DESCRIPTION OF THE PREFERRED EMBODIMENTS

Figure 1:
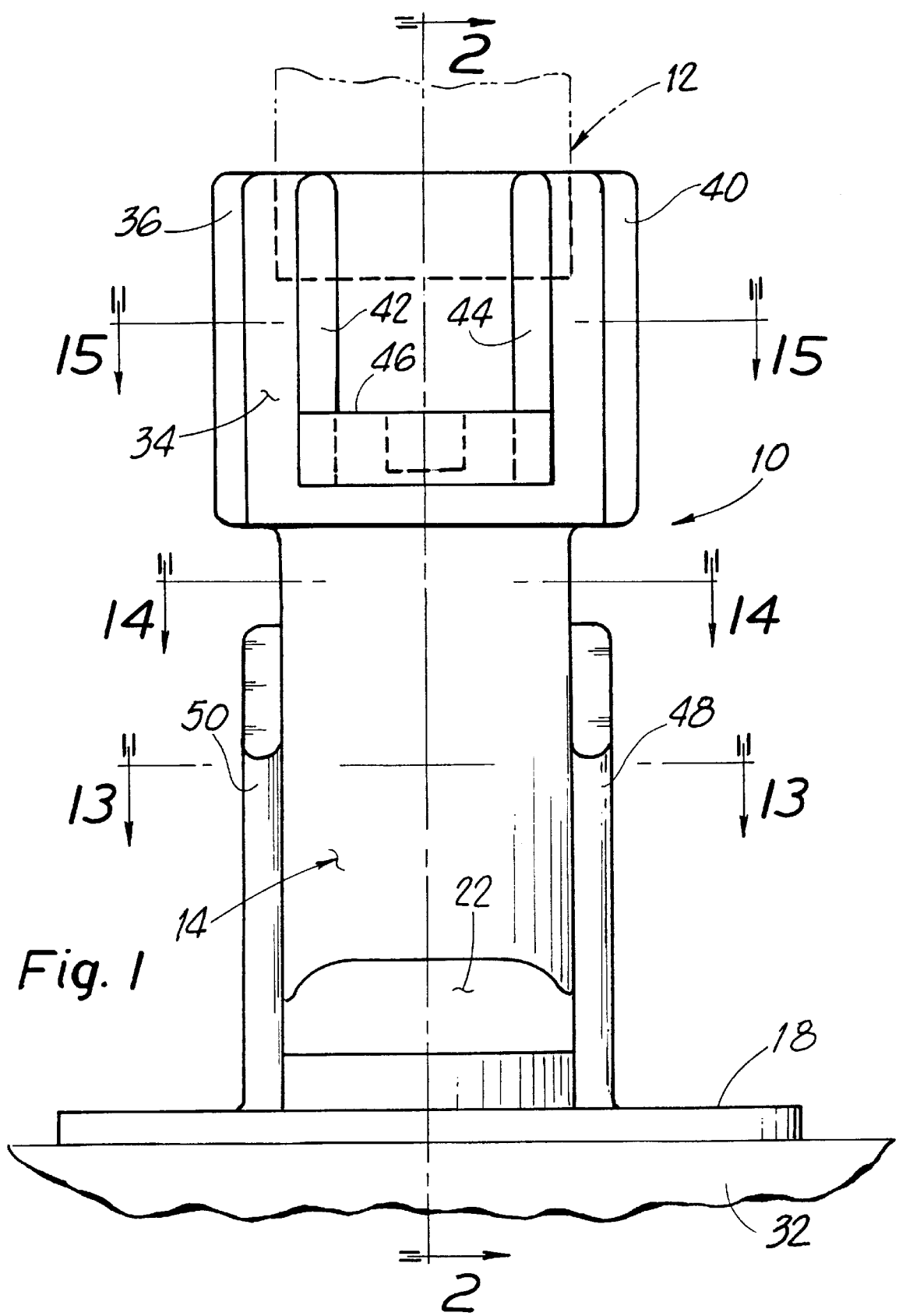
FIG. 1 is a side elevational view of a housing employable in practicing the invention.

Referring now in greater detail to the drawings, FIG. 1 illustrates in elevation a temperature sensor and control assembly 10 operatively connected as to an interconnecting electrical plug 12 of an associated electrical circuit. Referring to both FIGS. 1 and 2 the sensor assembly 10 is preferably comprised of a unitary outer housing 14 which, also preferably, is molded of plastics material.

Preferably, the outer housing 14 is comprised of plastics material and more particularly a 20% calcium carbonate filled polypropylene. Such is obtainable as from DSM Engineering Plastics of 2267 West Mill Road, Evansville, Ind., U.S.A. In the trade, DSM Engineering Plastics sells such material under the trade name or trademark Fiberfil. It should be made clear that the invention disclosed, described and claimed can be practiced employing other material; the identification of the material, Fiberfil, is merely to identify at least one material employable in the practice of the invention.

Figure 2:
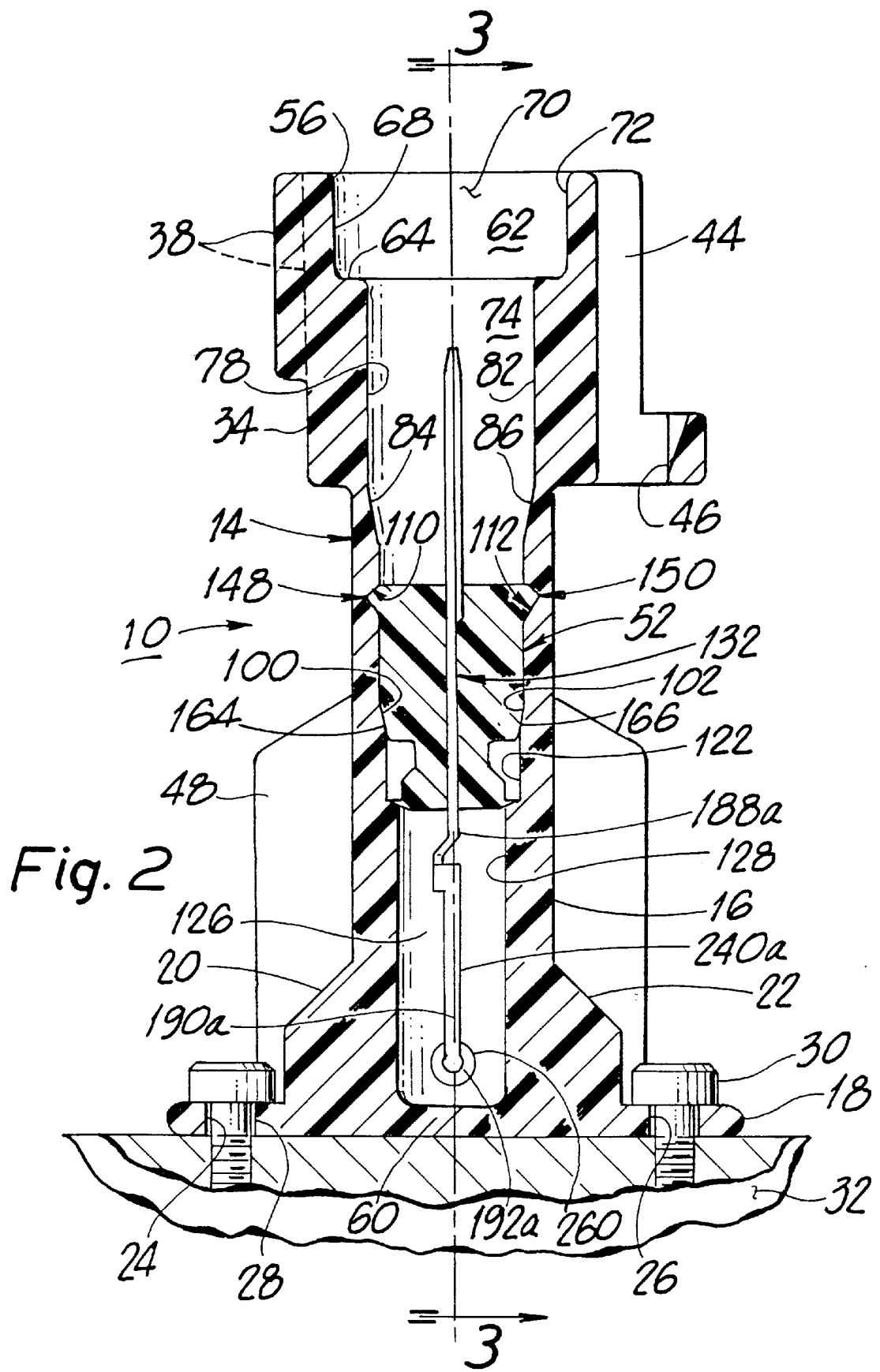
FIG. 2 is a cross-sectional view, in a somewhat smaller scale, taken generally on the plane of line 2—2 of FIG. 1 and looking in the direction of the arrows and illustrating other elements employable in practicing the invention.
Figure 3:
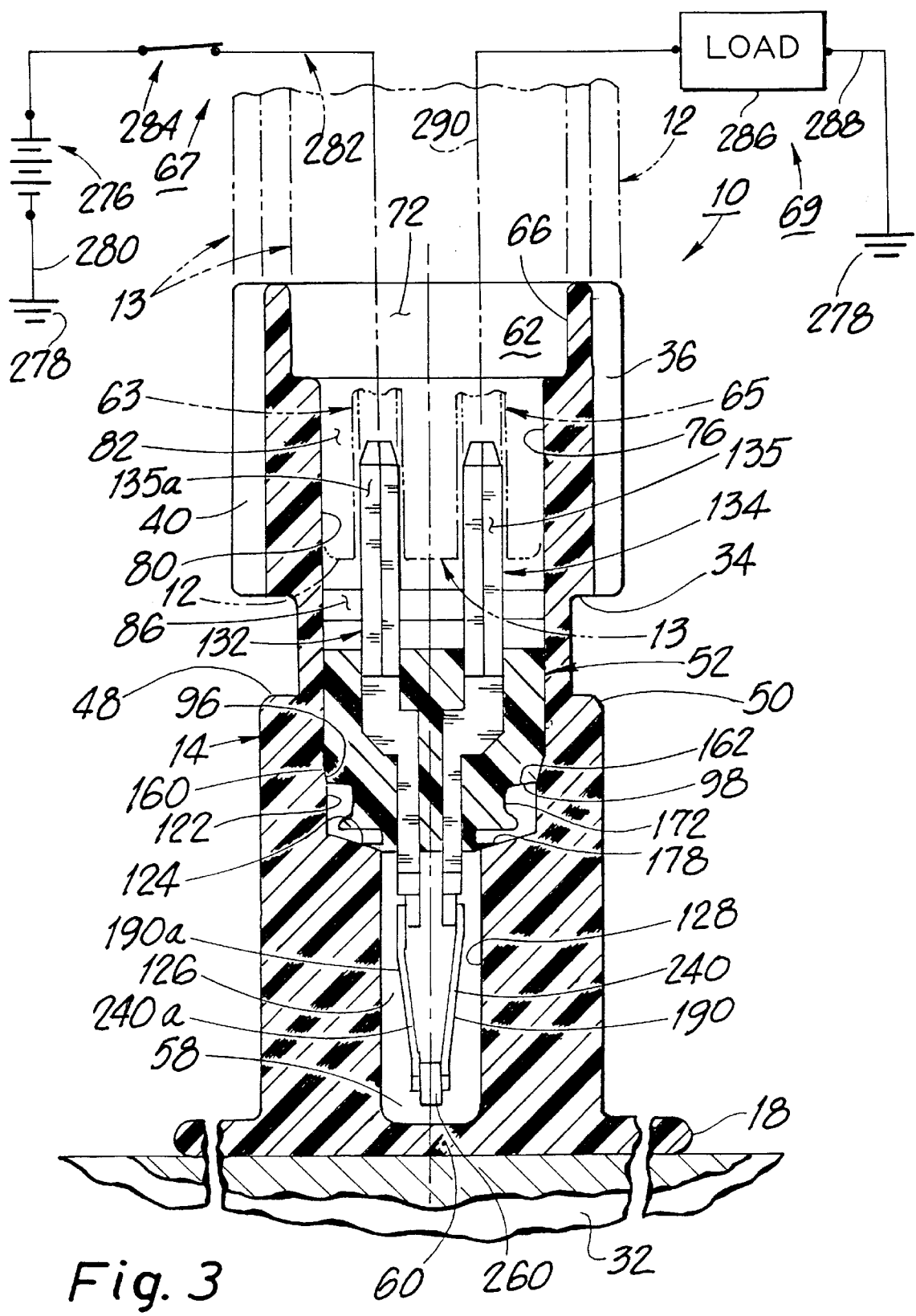
FIG. 3 is a cross-sectional view taken generally on the plane of line 3—3 of FIG. 2 and looking in the direction of the arrows.

Referring to all of FIGS. 1, 2 and 3, the housing 14 is depicted as comprising a relatively elongated body portion 16 having an enlarged base-like portion 18 with generally transitional portions 20 and 22. The body base portion 18 may be provided with suitable clearance passages 24 and 26 for respectively receiving screws 28 and 30 for securing the assembly 10 to related structure 32 forming, for example, a portion of an automotive vehicle.

The upper (as shown in FIGS. 1, 2 and 3) end of elongated body 16 is preferably formed as to provide a relatively transversely enlarged body portion 34 which, as depicted, may comprise generally parallel rib-like members or portions 36, 38 and 40 situated so that a coacting plug assembly 12 will be operatively received only if slots or clearances therein are of locations matched to the ribs 36, 38 and 40. Also, in the preferred embodiment, means are provided whereby a deflectable tab-like lever, carried by said plug assembly 12, is slidably received between opposed wall portions 42 and 44 and engageable with latch-like cross member 46 fixedly joined to the walls 42 and 44.

In the preferred embodiment, stiffening or reinforcing members or portions 48 and 50 are formed to add strength as to the lower half (as shown in FIGS. 1, 2 and 3) of the elongated body 16.

As depicted in FIGS. 2 and 3, a plug or inner body 52 is carried generally within housing or outer body 14.

Figure 4:
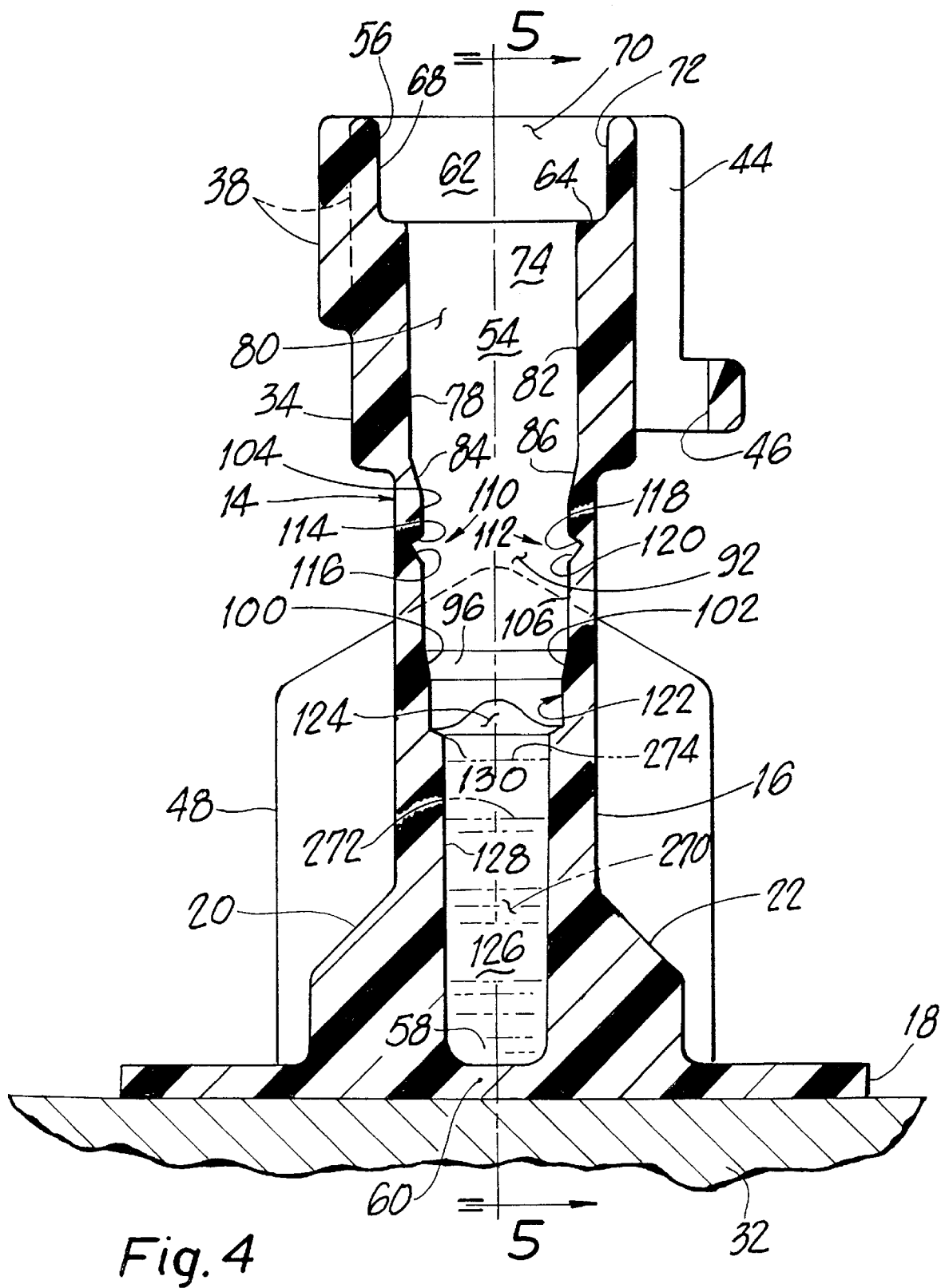
FIG. 4 is a cross-sectional view similar to that of FIG. 2 but of a slightly smaller scale and with the inner elements of FIG. 2 eliminated.
Figure 5:
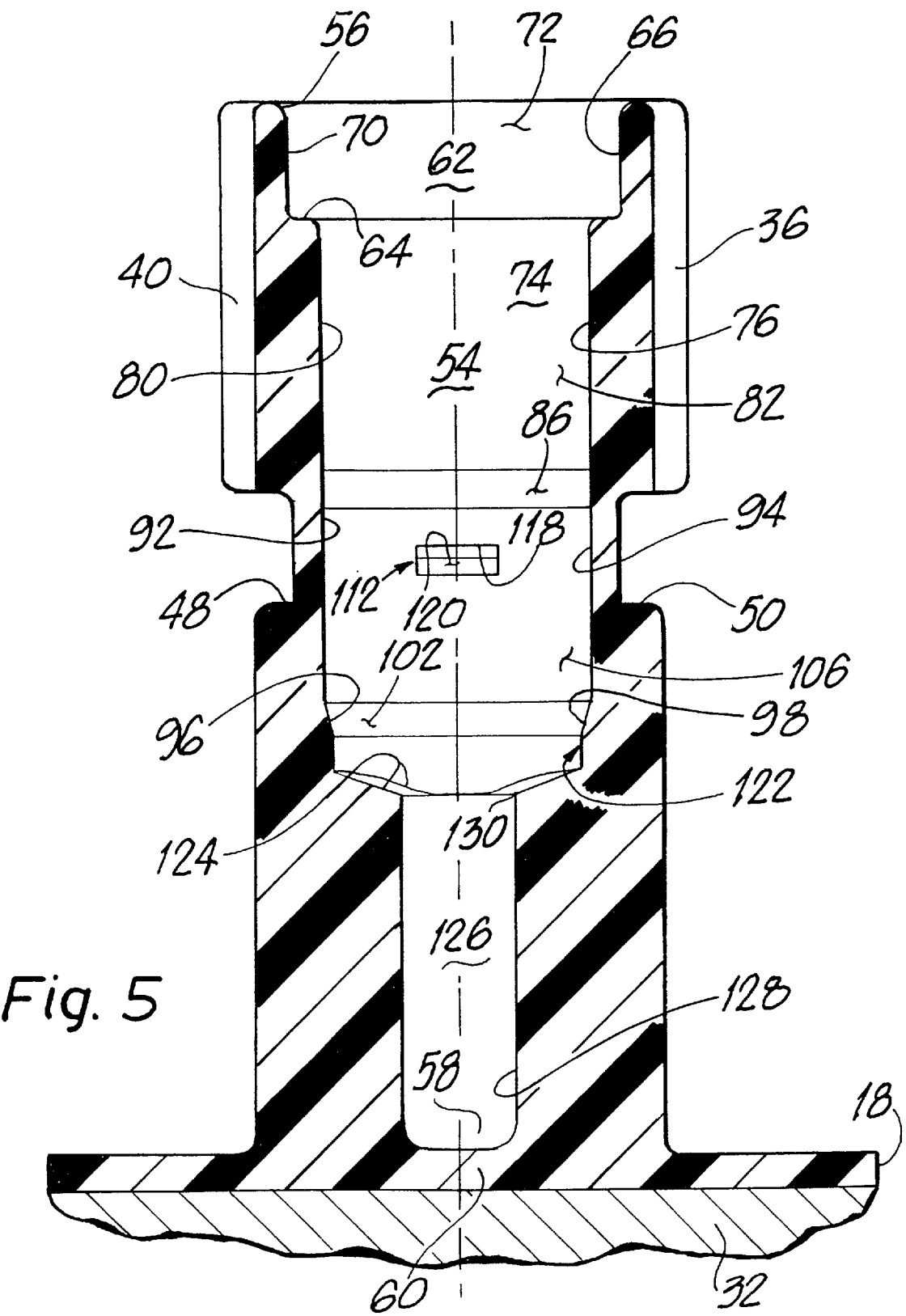
FIG. 5 is a cross-sectional view similar to that of FIG. 3 but of a slightly smaller scale and with the inner elements of FIG. 3 eliminated.

FIGS. 4 and 5 may be considered as respectively corresponding to FIGS. 2 and 3 without the inner body 52.

As depicted in FIGS. 4 and 5, the housing 14 is formed with a generally longitudinally extending passage 54 having an end opening 56 and an opposite end 58 closed as by a wall portion 60. In considering both FIGS. 4 and 5, it can be seen that in the preferred embodiment the passage 54 may be considered as being comprised of a plurality of passage sections or portions.

For example, starting at the upper end (as shown in FIGS. 4 and 5) of the housing 14, it can be seen that the passage means 54 comprises a first transversely relatively large passage portion 62 forming a shoulder 64 and having generally axially extending passage wall portions 66, 68, 70 and 72.

The passage portion 62 opens to and communicates with a next passage portion 74 of a transverse cross-section smaller than that of passage portion 62. In the preferred embodiment, the passage portion 74 is comprised of generally axially extending passage wall portions 76, 78, 80 and 82. As can be seen, opposite wall portions 78 and 82 are shown extending downwardly to where such wall portions 78 and 82 respectively join translational surfaces 84 and 86 which, downwardly, are inclined toward each other. Somewhat in comparison, other opposite passage wall portions 92 and 94 extend downwardly generally parallel to each other and respectively join second translational surfaces 96 and 98 which, downwardly, are inclined toward each other as generally depicted in FIG. 5.

As possibly best visually presented in FIG. 4, additional opposed wall portions 104 and 106 extend, generally parallel to each other, and respectively downwardly from the lower ends or edges of inclined surfaces 84 and 86. Wall portions 104 and 106 extend downwardly as to respectively join into, at the upper ends or edges thereof, inclined or transitional surfaces 100 and 102. The upper ends or edges of inclined or transitional surfaces 96, 102, 98 and 100, preferably are generally coplanar with respect to each other, as are the lower ends or edges of the same surfaces.

As possibly best seen in FIGS. 4 and 5, oppositely situated recesses or voids 110 and 112 are respectively formed into the wall portions 104 and 106. In the preferred form, and as viewed in for example FIG. 4, each of the recesses 110 and 112 is of a generally V-like configuration with recess 110 being comprised of an upper inclined surface 114 operatively meeting a lower inclined surface 116. Similarly, recess or groove 112 is comprised of an upper inclined surface 118 operatively meeting a lower inclined surface 120.

A relatively short passage 122 extends downwardly from the lower ends of surfaces 96, 100, 98 and 102 (also see FIG. 14). In the preferred embodiment, the passage 122, when viewed as in, for example, FIGS. 13, 14 or 15 is of a generally oblong configuration having an end surface 124 which is tapered as to be conical-like.

Passage means 54 is shown as further comprising passage or chamber means 126 which, as depicted, preferably has an axially extending cylindrical wall 128 which has an upper end 130 opening, as through surface 124, into passage 122.

As shown in FIGS. 2 and 3, the preferred embodiment of the assembly 10 comprises an inner body or plug 52 also preferably comprised of plastics material.

FIGS. 6 and 7 illustrate, in elevation and in relatively larger scale, the plug or mounting member 52 along with first and second electrical conductor members 132 and 134. The mounting member or inner body 52 along with conductor members 132 and 134 may be considered a subassembly 136 in that such is made prior to the insertion thereof into the passage means 54 of the housing or body means 14.

Referring now in greater detail to FIGS. 6, 7, 8 and 9, the inner body or mounting member 52 is shown as comprising a relatively enlarged main body portion 138 which may be formed as to have relatively short side wall surfaces or portions 140 and 142 and relatively long side wall surfaces or portions 144 and 146.

In the preferred embodiment surfaces or sides 144 and 146 are respectively provided with tabs or detent-like portions 148 and 150. As possibly best seen in FIGS. 6 and 8 tab-like means or portion 148 is preferably comprised of an inclined upper surface 152 and a lower inclined surface 154 which, collectively, define a wedge-like portion. Similarly, the tab-like means or portion 150 is preferably comprised of an inclined upper surface 156 and a lower inclined surface 158 which, also collectively, define a wedge-like portion. Portions 148 and 150 may be considered as comprising interlocking means which cooperatively function with related interlocking means comprised as of recesses or voids 110 and 112 (FIGS. 3, 4 and 5).

The lower (as viewed in any of FIGS. 6, 7, 8 or 9) end of the generally main body portion 138 is formed as to provide a generally inwardly inclined surface means comprised of two relatively short surface portions 160 and 162 which are functionally connected to two relatively longer surface portions 164 and 166 forming a generally continuous inclined surface 168 as possibly best shown in FIG. 11.

Continuing downwardly from the main body portion 138, an extension-like body portion 170 is preferably formed integrally with the main body portion 138. As seen in FIGS. 6, 7, 8 and 9, the extended body portion 170 is preferably comprised of a first extending body portion 172 which, in turn, carries a somewhat relatively enlarged flange-like portion 174. Also, formed integrally therewith a generally cylindrical body 176 extends further downwardly and, in turn, integrally carries a circular flange portion 178.

FIGS. 16–21 illustrate the preferred operations, as performed upon metal stock 180, in the formation of conductor 134.

As generally depicted in FIG. 16, the metal stock 180 is struck as by a die to, in effect, form a blank configuration 182 of what subsequently becomes the totally formed conductor member 134, as depicted, for example, in FIGS. 8 and 9.

In FIG. 16, the blank 182 is shown as comprising a relatively large upper (as shown in FIG. 16) portion 184 integrally formed with a somewhat necked-down body portion 186 in turn integrally formed with a generally eccentrically positioned body portion 188. Such body portion 188 is, in turn, integrally formed with a generally eccentrically positioned body portion 190. Preferably, the free end of body portion 190 is generally circularly enlarged as at 192.

As generally depicted, body portions or sections 184, 186, 188 and 190 extend generally in parallel relationship.

Referring to both FIGS. 16 and 17, the relatively enlarged upper body portion 184 terminates as at end portions 192 and 194. In the preferred embodiment the upper body portion 184 undergoes further forming so that such forming of longitudinal portions 196 and 198 takes place generally, respectively, on or about the phantom lines 200 and 202. The very upper end of upper body portion 184 is preferably provided with cut-out notches 204 and 206. When the longitudinal portions 196 and 198 are formed-over such notches 204 and 206 are effective for defining the tapered end of the terminal end of the electrical conductor 134. Once the portions 196 and 198 are formed-over as depicted in FIG. 18, such then, in cooperation with body portion 220, comprise a terminal end 135 of the continuous conductor 134.

In the preferred embodiment, edges 208 and 210 of body portion 186 are generally respectively aligned with bend or phantom lines 200 and 202. The body portion 186 and possibly most of the body portion 188 may be considered as comprising a generally medial portion of the electrical conductor member 134. An edge 212 of body portion 190 is shown as meeting a generally transverse edge 214. A relieved or cut-out portion 216 is formed as in body portion 188 to effectively enable the subsequent bending or forming of the body portion 190 relative to body portion 188 and generally about phantom bend line 218.

Subsequently to the cutting of blank 182, longitudinal portions 196 and 198 of body portion 184 are bent (upwardly from the plane of the drawing) generally about depicted respective bend lines 200 and 202 and, then, continuing with such bending about the bend lines, back downwardly toward the plane of the drawing as to be against the medial portion 220 and have respective longitudinal edges 222 and 224 juxtaposed to each other as best seen in FIG. 18.

Also, the body portion 188 is bent as at indicator line 226 to have a bent portion 228 be at a generally 45° angle with respect to body portion 188. Further, a bending operation is performed as at indicator line 230 in order to have EL juncture-like portion 232 and body 190 be at a generally 45° angle with respect to bent portion 228 and generally parallel to body portion 188.

Generally, the difference shown between FIGS. 19 and 20 resides in body portion 190 having been bent as about indicator line 218 (see FIGS. 16 and 18) and making such body portion 190 be generally normal to juncture-like portion 232 and body portion 188.

The arm, body portion or leg 190 is preferably further formed as to have a first bend, as at 236, and a second bend, as at 238 (FIG. 21), thereby defining a generally angled medial body portion 240 and respective end portions 242 and 246 which are generally parallel to each other.

Figures 8, 9:
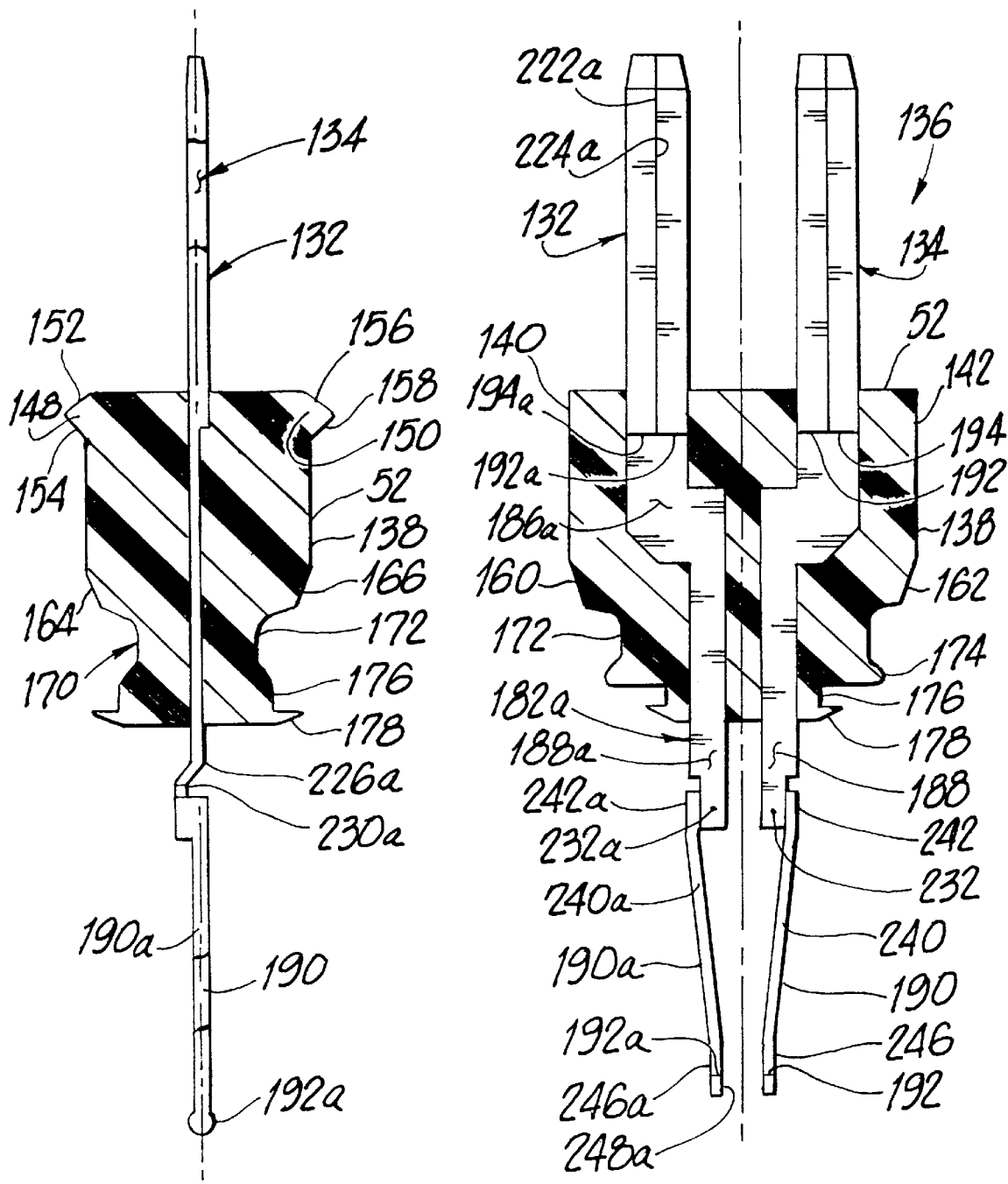
FIG. 8 is a cross-sectional view taken generally on the plane of line 8—8 of FIG. 6 and looking in the direction of the arrows.
FIG. 9 is a cross-sectional view taken generally on the plane of line 9—9 of FIG. 7 and looking in the direction of the arrows.

The other electrical conductor 132, as generally depicted in FIGS. 3, 8 and 9 may be considered a mirror image of the electrical conductor 134. Portions of the continuous electrical conductor 132 which are like those of continuous electrical conductor 134, as also depicted and described in FIGS. 16–21, are identified with like reference numbers provided with a suffix "a". Only so many of such suffix "a" numbers are used as is believed necessary to disclose the continuous electrical conductor 132. After the medial body portions or extensions 240 and 240a as well as ends 246 and 246a are formed, as depicted generally in FIG. 8, a thermistor 260 is placed between the generally inner surfaces 248 and 248a and fixedly secured thereto as by, for example, soldering as to establish electrical conductivity through the thermistor 260 with portions 192 and 192a, of respective conductors 134 and 132, effectively serving as electrical terminals.

In the preferred embodiment, each of the continuous conductors 134 and 132 is comprised of CA260 Half Hard Brass which, further, is preferably 0.3175 mm.±0.0127 mm. thick (0.0125±0.0005 inches thick) and tin plated to a plate thickness of from 0.00254 mm. to 0.00762 mm. (0.0001 to 0.0003 inches). Such material, the thickness thereof and plating, if any, is by way of example and not of limitation.

The continuous conductors 132 and 134, being thusly formed, are then held in generally parallel spaced relationship to each other so as to be generally coplanar and having respective positions as depicted in FIGS. 2 and 3 and FIGS. 8 and 9. At that time, as by a suitable molding apparatus, plastics material is formed onto and about portions of conductors 132 and 134 to form the inner body 52 (FIGS. 2, 3, 6, 7, 8, 9, 10, 11 and 12).

In the preferred embodiment, the plug or body 52 comprises "Zytel". "Zytel" is a trademark of DuPont de Nemours, E. I. & Co. for nylon resin available as molding powder, extrusion powder and soluble resin. The preferred composition is 33% glass filled nylon obtainable, for example, from DuPont Engineering Polymers having an address of: 1007 Market Street, Wilmington, Del., U.S.A. Again, this is by way of example and not of limitation in that other plastics materials are available for practicing the invention. It should be made clear that the invention disclosed, described and claimed can be practiced employing other plastics material; the identification of the material, Zytel, is merely to identify at least one material employable in the practice of the invention.

Referring primarily to FIGS. 2, 3, 6, 7,8 and 9, the subassembly 136 (as shown in FIGS. 6 and 7) is introduced into passage portion 74 and moved generally longitudinally (downwardly as viewed in FIGS. 4 and 5) resulting in the detent members or portions 148 and 150 (of body 138) respectively slidably engaging ramps or transitional surfaces 84 and 86. As the subassembly 136 is continued to be moved downwardly (as viewed in FIGS. 4 and 5), the detent or tab-like portions 148 and 150 slide onto the inner surfaces of wall portions 104 and 106, respectively. During such movement, the relative resilience of the plastics materials, enables the wall portions 104 and 106 to be urged somewhat outwardly (i.e., away from each other) by the general spreading thereof brought about by the mounting body 52 and tab-like means 148 and 150, while such mounting body 52 and tab-like means 148 and 150 are somewhat compressed (i.e., the tab means 148 and 150 being resiliently moved toward each other). Such resilient deformation enables the subassembly 136 to continue to be moved until detent or wedge portion 148 comes into registry with recess or void 110 and wedge portion 150 comes into registry with recess or groove 112. When such occurs, the resilient: deflections incurred by wall portions 104 and 106 (of outer housing 14) and the resilient deflections incurred by plug or body 52 and its wedges 148 and 150 are, in the main, released so that the locking detents 148 and 150 become respectively received in cooperating grooves or recesses 110 and 112, as depicted in FIG. 2.

As shown in FIGS. 2, 3, 6, 7, 8, 9, 10 and 11, the plug or mounting member 52 is preferably provided with a somewhat lower disposed circumscribing inclined surface 168 comprised as of relatively longer inclined surfaces 164 and 166 and relatively shorter inclined surfaces 160 and 162. When body or carrier 52 is positioned (as by the respective engagements of recesses 110 and 112 with locking detents 148 and 150) inclined surfaces 164 and 166 become at least in juxtaposition with inclined seating or abutment surfaces 100 and 102 of outer housing 14 and inclined surfaces 160 and 162 become at least in juxtaposition with inclined seating or abutment surfaces 96 and 98 of outer housing 14. The expression "at least" is employed because such juxtaposed surfaces may be in abutting engagement with each other.

With the subassembly 136 being thusly situated within outer housing 14, continuous conductors 132 and 134 have their upper portions (as viewed in FIGS. 3, 6, 7 and 8) situated generally within conduit, passage or chamber portion 74 (also see FIGS. 2, 4 and 5) while the lower portions 240, 240a, 232, 232a, 188 and 188a along with thermistor 260 are situated generally within chamber means 126 (see FIGS. 3, 4, 5 and 7).

Further, in the preferred embodiment, with the subassembly 136 being situated, as described, within passage means 54, the relationships of the various elements are such as to cause the flange portion 178, of body 52, to engage surface 124 (FIGS. 4, 5, 13 and 14) and because of the resilient resistance of the material comprising the flange portion 173 result in flange 178 undergoing limited resilient deformation and thereby precluding the passing of any undesired substance as from chambers 74 to and into chamber 126 and as from chamber 126 to and into chamber 74.

In the preferred embodiment a thermal conducting material or heat transfer compound is applied to chamber means 126 as to rapidly convey the temperature at surface 128 (see FIGS. 3, 4 and 5) to the temperature responsive means 260. Doing such is generally well known in the art. In the preferred embodiment of the invention, the heat transfer compound employed is a silicone grease, commercially sold under the trade name of "Castall G-800" with such being obtainable from Castall, Inc. having a business address of: Weymouth Industrial Park, East Weymouth, Mass.

In the preferred arrangement, the heat transfer compound is introduced into chamber means 126 before portions 240 and 240a become inserted into chamber 126. For example, referring to FIG. 4, chamber 126 may initially be filled with the heat transfer compound 270 to a level as at 272. When the subassembly 136 is placed into passage 54 and opertively connected to the housing 14, the heat transfer compound 270 becomes partially displaced causing the level of such heat transfer compound 270 to rise as to, for example, a level 274. For believed improved clarity, such heat transfer compound 270 is not depicted in any other drawing Figures.

It should be clear that the invention can be practiced with or without the use of a heat transfer compound and, if a heat transfer compound is employed, the actual compound which may be used is not limited to the use of said "Castell G-800" which has been disclosed by way of example and not of limitation. In those situations wherein a heat transfer substance 270 is employed, the flange 178, pressed as against surface 124, is effective to preclude the flowing of the heat transfer substance 270 out of chamber 126 and into, for example, chamber 122.

OPERATION OF INVENTION

With the temperature responsive probe assembly 10 assembled as hereinbefore disclosed and described, the assembly 10 may be operatively connected to related electrical coupling means 12 and associated electrical circuitry.

For example, referring to FIG. 3, the coupling means 12 may be comprised of a suitable coupling body 13 receivable as by passage portions 62 and 54 (also see FIGS. 4 and 5) and carrying electrically conductive contact means 63 and 65 which are in electrical engagement with terminal portions 135a and 135, respectively. The contact means 63 and 65 may be considered as respectively comprising portions of electrical circuit means 67 and 69.

As schematically illustrated in FIG. 3, circuit means 67 may comprise a source of electrical potential 276 being led to ground 278, as via conductor means 280, and electrically connected to conductor means 282 leading as to contact means 63. Conductor means 282 may comprise electrical switch 284. As depicted, circuit means 69 comprises an associated electrical load 286 brought to ground 278 as by a conductor means 288 and operatively electrically connected to contact means 65 as by a conductor means 290.

As is well known in the art, a thermistor is a solid-state semiconducting device whose electrical resistance varies with its sensed temperature. Both types of thermistors exist; i.e., the group of thermistors in which the electrical resistance increases as its sensed temperature becomes colder and the group of thermistors in which the electrical resistance decreases as its sensed temperature becomes colder. It may be assumed, for purposes of disclosure, that thermistor 260 is the type in which the resistance thereof increases with sensed temperature decrease.

Generally, the overall system disclosed in FIG. 3 would comprise the source of electrical potential 276, conductor means 282 and switch means 284, electrical contact 63, terminal 135a of unitary conductor 132, thermistor 260, leg 240 of unitary conductor 134, terminal 135, contact 65, conductor means 290, load 286 and, via conductor means 288, to ground 278. With the assumed type or characteristics of thermistor 260, as its sensed temperature decreases the resistance thereof increases with the result that, accordingly, both voltage and current through thermistor 260 are correspondingly decreased.

EMBODIMENT OF FIG. 22

FIG. 22 depicts a further embodiment of the inventive structure. For purposes of disclosure it may be assumed that the overall structure, of which a fragmentary portion is depicted, is as disclosed in FIG. 3. Accordingly, all elements shown in FIG. 22 which are like or similar to those of FIG. 3 are, except as otherwise noted, identified with like reference numbers.

In the embodiment of FIG. 22, an elastomeric seal, such as an O-ring 292, is provided as about surface 172 of body 52 whereby the seal is resiliently deformably contained between surface 172 and opposed surface 122 of outer housing 14. Such sealing means might be employed in those situations or conditions wherein sealing against intrusion or eliminating air leakage is required.

EMBODIMENT OF FIG. 23

In FIG. 23, all elements which are like or similar to any of the preceding Figures are, except as noted to the contrary, identified with like reference numbers.

In the embodiment of FIG. 23, the outer body or housing 14 is shown as provided with a body portion 294 which, in turn, carries tool-engaging surface means 296 and 298. Preferably formed integrally with body portion 284 and extending downwardly therefrom (as viewed in FIG. 23) is an axially extending body portion 300 externally threaded as at 302 for cooperative threaded engagement with an internally threaded portion 304 formed as in a wall 306 of an associated structure 308. Annular sealing means and/or washer means 310 may be provided as between the enlarged body portion 294 and an outer surface 312 of wall 306.

The outer body or housing 14 has a probe-like extending portion 314, preferably integrally formed with axially extending body portion 300, as to be in the fluid or gaseous medium 316 generally in structure 308. Openings or passages 318, 320 and 322 are formed through the wall of probe-like portion 314 thereby placing the thermistor 260 into operative contact with the medium 316. Such passageways, in turn, define remaining relatively narrow portions 324, 326 and 328 of the probe extension 314. In the preferred embodiment, the thermistor 260 is coated with epoxy 330, as is well known in the art to offer a degree of protection to the thermistor 260.

The chamber 126 which, in the embodiment of FIG. 23, is effectively vented via 318, 320 and 322 to the fluid 316 to be sensed, may be of any suitable configuration and, as depicted, may have a longitudinally extending generally flat surface 332.

By way of limited review, it should now be apparent that by producing subassemblies 136 in substantially constant dimensional relationships and producing the cooperating outer housings or bodies, as 14, also with substantially constant dimensional relationships, it becomes possible to mass produce the assemblies 10 by assembling respective ones of such subassemblies 136 to respective ones of cooperating outer housings or bodies, as 14, without any worry that, for example, the thermistor 260 might interferingly engage the inner surface of the chamber 126.

Further, no sealing problem exists in those situations wherein a heat transfer substance, as at 270, is employed because in the preferred embodiment, the circumscribing flange 178 carried by body 52 automatically seals the chamber means 126 as from chamber portion 122. That is, when subassembly 136 is moved into its place, i.e., assembled to outer housing or body 14, the sealing flange or member 178 effectively sealingly engages surface 124 which surrounds the opening of chamber means 126.

With regard to sealing, the preferred embodiment also provides for circumscribing sealing means, as at 292, to assure against intrusion of undesired material into or eliminating leakage from chamber means containing the thermistor 260.

EMBODIMENT OF FIGS. 25–28

In the embodiment of FIGS. 25–28, all elements which are like or similar to any of the elements of preceding Figures, except as noted to the contrary, are identified with like reference numbers.

Figure 25:
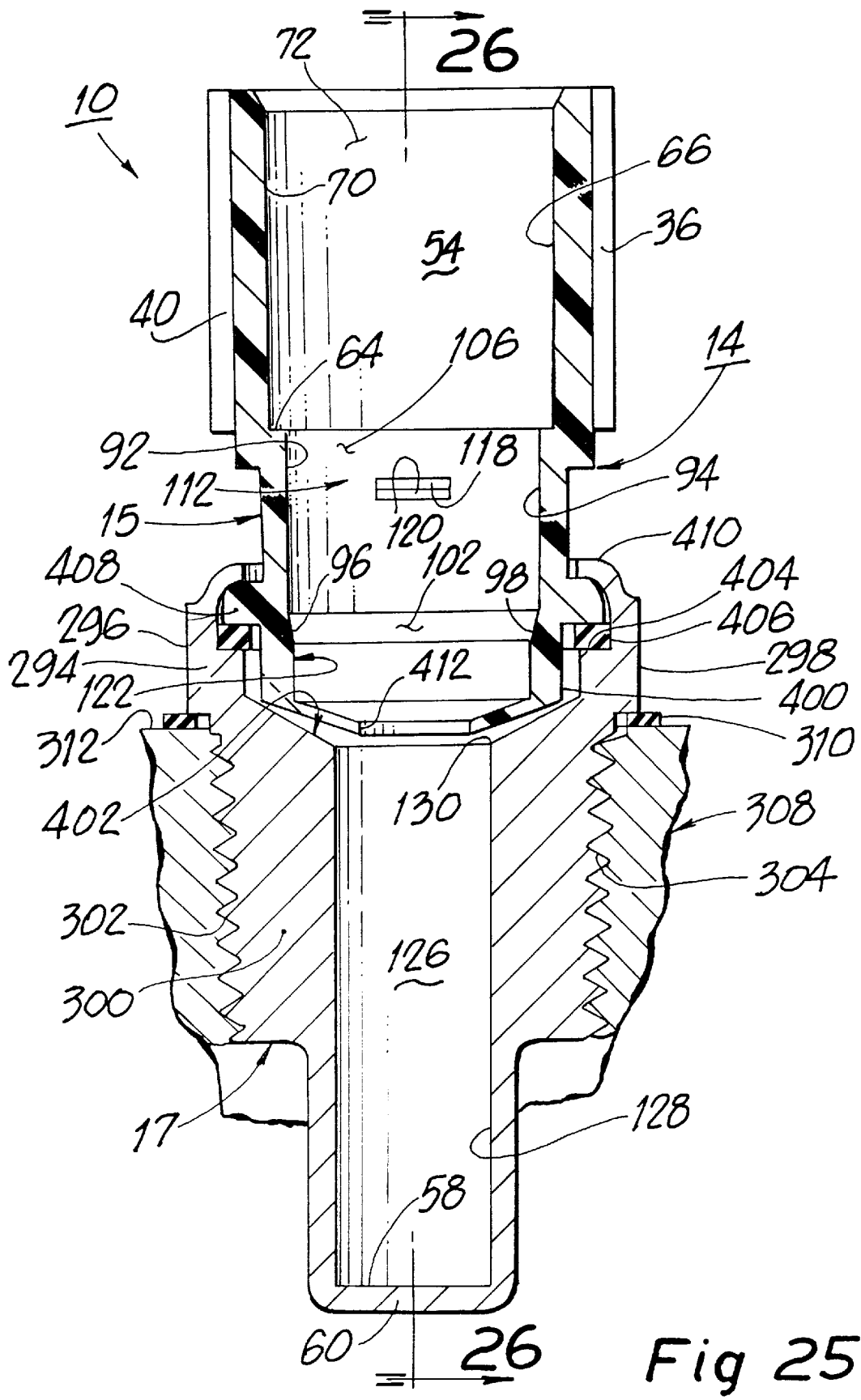
FIG. 25, a view similar to that of FIG. 5, depicts a further embodiment of the invention.

Referring in particular to FIG. 25, the housing 14 is depicted as comprising at least two separate housing sections 15 and 17 with housing section 15 being of a suitable plastics material while housing section 17 may be formed from a suitable metal such as, for example, brass. As stated with regard to previous Figures, housing section 15 may be comprised of a 20% calcium carbonate filled polypropylene. Such is obtainable as from DSM Engineering Plastics of 2267 West Mill Road, Evansville, Ind., U.S.A. In the trade, DSM Engineering Plastics sells such material under the trade name or trademark Fiberfil. It should be made clear that the invention as disclosed in FIGS. 25–28 can be practiced employing other material; the identification of the material, Fiberfil, is merely to identify at least one material employable in the practice of the embodiment of FIGS. 25–28.

In the embodiment of FIGS. 25–28 the housing section 15 is shown as having a lower depending portion 400 which is received in a cavity or chamber 402 formed in housing 17. In the preferred embodiment a circular or annular flange-like surface 404 is formed generally about chamber 402 and such surface 404 provides an abutment against which an annular elastomeric sealing member 406 is seated. As shown for example in both FIGS. 25 and 26 housing section 15 is preferably provided with a generally circular or cylindrical flange portion 408 which, as depicted, may be in sealing engagement with annular seal 406. In the preferred embodiment, the upper (as shown in FIG. 25) end of housing member 17 is formed-over, as generally depicted at 410 as to thereby hold housing sections 15 and 17 in assembled relationship and to urge flange 408 against seal 406. As also best shown in FIG. 25, housing section 15 is provided with an aperture 412 which effectively communicates with chamber 126.

Figure 26:
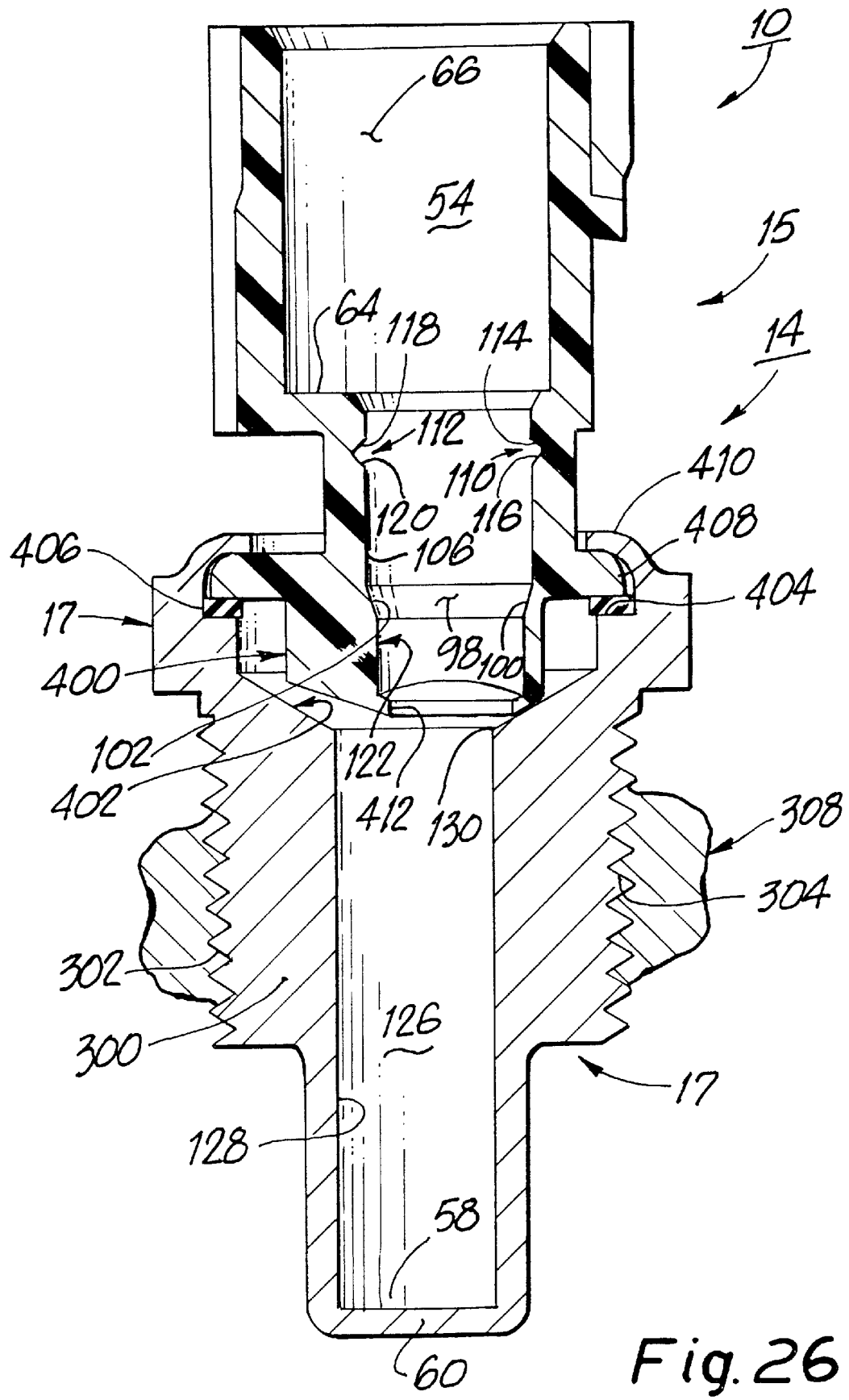
FIG. 26 is a cross-sectional view taken generally on the plane of line 26—26 of FIG. 25 and looking in the direction of the arrows.
Figure 27:
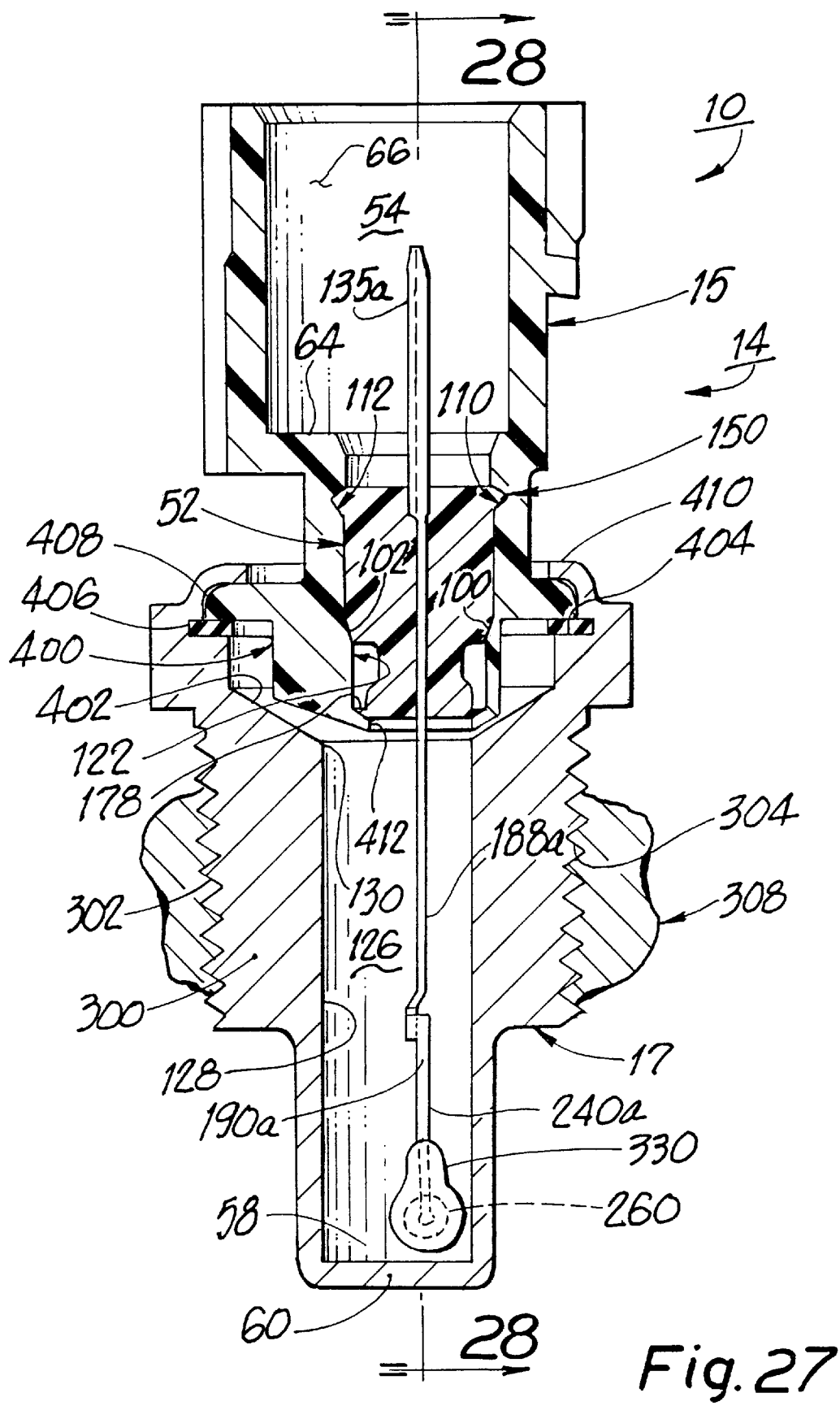
FIG. 27 is a view similar to that of FIG. 2 but depicting the further embodiment of the invention of FIGS. 25 and 26.
Figure 28:
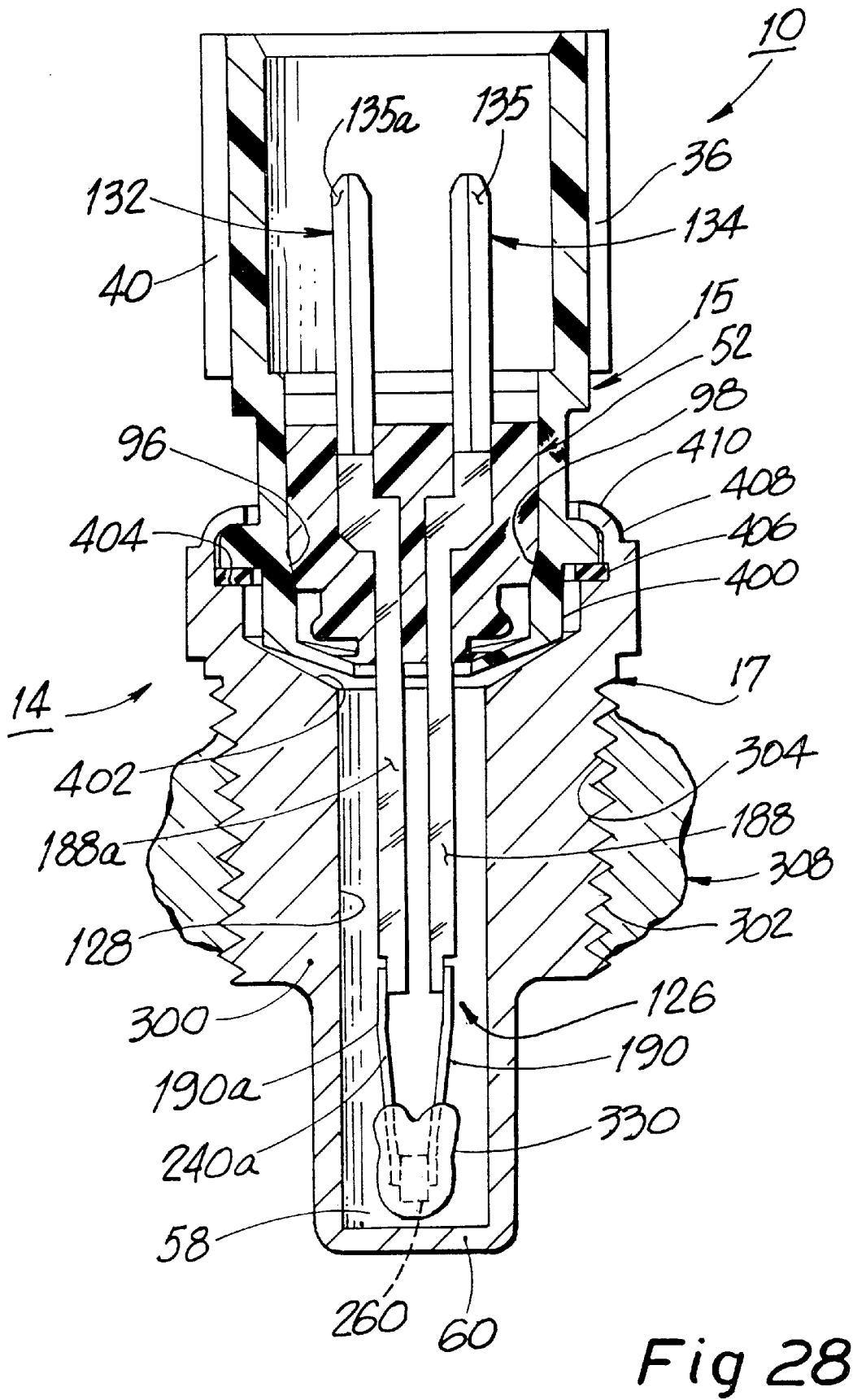
FIG. 28 is a cross-sectional view taken generally on the plane of line 28—28 of FIG. 27 and looking in the direction of the arrows.

FIGS. 27 and 28 depict the housing 14 of FIGS. 25 and 26 provided with other elements as already described as in FIGS. 1–24 to thereby complete the entire assembly 10.

The various elements shown in FIGS. 25, 26, 27 and 28 function in the same manner as do the corresponding elements in the preceding Figures.

As already briefly described, the prior art has, employed and continues to employ wires, which have first and second ends, for electrically connecting an electrical device as to, for example, electrical terminals which, in turn, are intended for electrical connection as to externally situated circuit means. With regard to the disclosed embodiments, if such were to include the prior art instead of the inventive structures disclosed, in FIGS. 7, 8, 27 and 28, for example, the electrical conductor members 132 and 134 would not be employed but rather, at least, portions 188 and 188a would be cut-off, i.e., terminated as to have free ends extending downwardly from body 52 and portions 232 and 232a along with arm or leg portions 190 and 190a would be eliminated. Instead, the hypothetical free ends of hypothetical cut portions 188 and 188a would be modified as in U.S. Pat. No. 5,046,857 which depicts U-shaped end portion 16c and 18c primarily mechanically gripping ends of wires 38. As in said U.S. Pat. No. 5,046,857 the other ends of the wires 38 would be operatively connected directly to the thermistor as depicted at 20 of said U.S. Pat. No. 5,046,857. Wires, terminal members with crimping portions engaging the wires which, in turn, lead to and directly contacting a temperature sensor are also shown in U.S. Pat. No. 4,243,968 which, in such respect, is not inconsistent to said U.S. Pat. No. 5,046,857.

Experience has shown that such prior art wire connections are rather significantly subject to failure especially during use. That is, among possible other causes of such prior art failures is the fact that wire has been used for providing both a mechanical and electrical connection as between the terminals and a temperature sensor as described and disclosed in said U.S. Pat. Nos. 4,243,968 and 5,046,857.

Wire, whether comprised of a single cross-sectional solid body or of a bundle or plurality of bodies, is in the main of generally cylindrical configuration. This in itself could lead to the failures in the prior art. The methods of connection shown in said U.S. Pat. Nos. 4,243,968 and 5,046,857 result: in what may be considered a line contact, or line contacts, as between: (a) the wire leads 28 and 29 and crimps 48—48 of U.S. Pat. No. 4,243,968 and (b) the wire leads 38—38 and U-shaped portions 16c and 18c of U.S. Pat. No. 5,046,857. Even though the soldering or welding of such connections does bring about the strengthening thereof, such connections still are not strong enough as evidenced by the experienced failures thereof.

Among the benefits obtained by the invention disclosed and taught herein, are having the conductor means, as for example 134, be of unitary one-piece construction. Also, the conductor means, as for example 134 or 132, is not formed of wire, that is, not of metal stock of cylindrical cross-section as wire used in the prior art. In the preferred embodiment, a generally medial portion 188 of the conductor means 134 has an integrally formed extending arm or leg-like portion 190 which, in turn, has its end 192 physically and electrically connected to one electrical side of the thermistor 260. In viewing continuous conductor 134, as in FIGS. 3, 8, 9, 16–21, 22 and 23, it can be seen that, for example, the width of the medial portion 188 is significantly greater than the thickness thereof. That, in turn enhances the rigidity of the medial portion 188 resisting the bending thereof in directions toward and/or away from the cooperating continuous conductor as 132. As shown in FIGS. 18, 19, 20 and 21 the arm or leg portion 190 is integrally formed as with and operatively carried by the medial portion 188 as to be an extension thereof. Further, it can be seen, as in FIGS. 16 and 17 as well as FIGS. 18 and 19, that the width of the leg portion 190 is significantly greater than the thickness thereof. Also, as seen in FIGS. 20 and 21, when the arm or extension 190 is bent, as about line 218, the plane of the wider portion of arm 190 intersects the plane of the wider portion of medial portion 188. Just as recited with regard to medial portion 188, so too the bent (FIGS. 20 and 21) extension enhances its own rigidity resisting bending thereof in directions toward and away from the plane of the drawing as viewed, for example, in FIGS. 7, 8, 21, 23, 27 and 28. As already indicated, in the preferred embodiment, the plane of the wider portion of extension 190, when bent as depicted in FIGS. 7, 8, 20, 21, 23, 27 and 28, is generally perpendicular to the plane of the wider portion of the medial section 188.

Although only a preferred embodiment and a limited number of modifications of the invention have been disclosed and described it is apparent that other embodiments and modifications of the invention are possible within the scope of the appended claims.

What is claimed is:

1. A thermal probe assembly, comprising an outer housing having first and second ends situated generally oppositely to each other, wherein said first end comprises an open end adapted to receive an associated electrical connector unit, wherein said second end comprises a probe portion, wherein said outer housing comprises wall portions in turn defining a bore having said open end in communication therewith, wherein said bore extends into said probe portion, a mounting member premolded of a plastics material, first and second electrical conductors respectively extending through and carried by said mounting member, said first and second electrical conductors respectively comprising first and second end terminal portions for operative connection to said associated electrical connector unit, wherein said first electrical conductor comprises a third end generally opposite to said first end terminal portion and wherein said second electrical conductor comprises a fourth end generally opposite to said second end terminal portion, a thermistor physically carried by and electrically connected to said third and fourth ends of said first and second electrical conductors, wherein said mounting member which carries said first and second electrical conductors and said thermistor is slidably fit into said bore in order to position said thermistor into that portion of said bore which extends into said probe portion, first interlocking means carried and formed by said outer housing within the bore thereof, second interlocking means carried and formed by said mounting member, and wherein when said mounting member is slidably moved in said bore to a preselected position said first and second interlocking means then operatively engage each other and maintain said mounting member in said preselected position.

2. A thermal probe assembly according to claim 1 wherein said first electrical conductor comprises a first one-piece unitary conductor member of continuous uninterrupted length extending from and including said first end terminal portion to and including said third end, and wherein said second electrical conductor comprises a second one-piece unitary conductor member of continuous uninterrupted length extending from and including said second end terminal portion to and including said fourth end.

3. A thermal probe assembly according to claim 2 wherein said first electrical conductor comprises at least one external planar surface extending from said first end terminal portion to and including said third end, and wherein said second electrical conductor comprises at least one external planar surface extending from said second end terminal portion to and including said fourth end.

4. A thermal probe assembly according to claim 3 wherein said first electrical conductor comprises first and second conductor portions, wherein said first conductor portion comprises said first end terminal portion, wherein said second conductor portion comprises said third end, and wherein the plane of said at least one external planar surface carried by said third end is generally normal to the plane of said at least one external planar surface carried by said first end terminal portion.

5. A thermal probe assembly according to claim 3 wherein said first electrical conductor comprises first and second conductor portions, wherein said first conductor portion comprises said first end terminal portion, wherein said second conductor portion comprises said third end, wherein the plane of said at least one external planar surface carried by said third end is generally normal to the plane of said at least one external planar surface carried by said first end terminal portion, wherein said second electrical conductor comprises third and fourth conductor portions, wherein said third conductor portion comprises said second end terminal portion, wherein said fourth conductor portion comprises said fourth end, and wherein the plane of said at least one external planar surface carried by said fourth end is generally normal to the plane of said at least one external planar surface carried by said second end terminal portion.

6. A thermal probe assembly according to claim 1 wherein said first and second interlocking means comprise a first detent portion carried by a wall portion of said outer housing as to be generally exposed to said bore, wherein said first and second interlocking means comprise a second detent portion carried by said mounting member, and wherein said first and second detent portions operatively engage each other to thereby maintain said mounting member in said preselected position.

7. A thermal probe assembly according to claim 6 wherein said first detent portion comprises a recess formed in a wall portion of said outer housing, wherein said second detent portion comprises a protuberance, and wherein when said mounting member reaches said preselected position said protuberance is operatively received by said recess.

8. A thermal probe assembly according to claim 7 wherein said protuberance is integrally formed with said mounting member.

9. A thermal probe assembly according to claim 7 wherein said protuberance comprises a wedge-like configuration.

10. A thermal probe assembly according to claim 1 wherein said first interlocking means comprise first and second detent portions carried by said wall portions of said outer housing as to be generally exposed to said bore, wherein said second interlocking means comprise third and fourth detent portions carried by said mounting member, and wherein said first and third detent portions operatively engage each other and said second and fourth detent portions operatively engage each other to thereby maintain said mounting member in said preselected position.

11. A thermal probe assembly according to claim 10 wherein said first detent portion is carried by a first of said wall portions, wherein said second detent portion is carried by a second of said wall portions, and wherein said first and second wall portions are located generally opposite to each other with said bore being generally between said first and second wall portions.

12. A thermal probe assembly according to claim 1 wherein both of said outer housing and said mounting member are resiliently deformable, and wherein said outer housing is comparatively more readily resiliently deformable than is said mounting member.

13. A thermal probe assembly according to claim 1 wherein said outer housing is comprised of a plastics material.

14. A thermal probe assembly according to claim 13 wherein said plastics material from which said mounting member is comprised is different from the plastics material from which said outer housing is comprised.

15. A thermal probe assembly according to claim 1 wherein said wall portions of said outer housing comprise a seating surface projecting generally inwardly of said bore, wherein said mounting member carries a generally radially outwardly extending flange, and wherein when said mounting member is in said preselected position said flange is in engagement with said seating surface.

16. A thermal probe assembly according to claim 15 wherein said mounting member and said flange are integrally formed with each other.

17. A thermal probe assembly according to claim 15 wherein said flange is resiliently deflectable, and wherein when said flange is in engagement with said seating surface said flange is resiliently deflected.

18. A thermal probe assembly according to claim 6 wherein said wall portions of said outer housing comprise a seating surface projecting generally inwardly of said bore, wherein said mounting member carries a generally radially outwardly extending flange, and wherein when said mounting member is in said preselected position said flange is in engagement with said seating surface.

19. A thermal probe assembly according to claim 18 wherein said mounting member and said flange are integrally formed with each other.

20. A thermal probe assembly according to claim 18 wherein said flange is resiliently deflectable, and wherein when said flange is in engagement with said seating surface said flange is resiliently deflected.

21. A thermal probe assembly according to claim 1 wherein a surface portion of one of said wall portions carries a ramp-like surface for operatively engaging said mounting member as said mounting member is moved in said bore toward said preselected position and through such engagement urging said mounting member toward and against an other of said wall portions opposite to said one of said wall portions.

22. A thermal probe assembly according to claim 1 wherein a first surface portion of one of said wall portions carries a first ramp-like surface, wherein a second surface portion of an other of said wall portions carries a second ramp-like surface, wherein said first ramp-like surface and said second ramp-like surface operatively engage said mounting member as said mounting member is moved in said bore toward said preselected position, wherein as said mounting member thusly engaging said first and second ramp-like surfaces moves toward said preselected position said one and said other wall portions are urged in directions away from each other.

23. A thermal probe assembly according to claim 1 wherein said first interlocking means comprise first and second detent portions carried by said wall portions of said outer housing as to be generally exposed to said bore, wherein said second interlocking means comprise third and fourth detent portions carried by said mounting member, wherein said first and third detent portions operatively engage each other and said second and fourth detent portions operatively engage each other to thereby maintain said mounting member in said preselected position, wherein said first detent portion is carried by a first of said wall portions, wherein said second detent portion is carried by a second of said wall portions, wherein said first and second wall portions are located generally opposite to each other with said bore being generally between said first and second wall portions, wherein said wall portions of said outer housing comprise a seating surface projecting generally inwardly of said bore, wherein said mounting member carries a generally radially outwardly extending flange, wherein when said mounting member is in said preselected position said flange is in engagement with said seating surface, wherein said mounting member and said flange are integrally formed with each other, wherein said flange is resiliently deflectable, and wherein when said flange is in engagement with said seating surface said flange is resiliently deflected.

24. A temperature responsive assembly, comprising housing means, passage means formed in said housing means, internal body means adapted to be positioned at a predetermined location within said passage means, said internal body means when so positioned within said passage means forming a chamber-like portion in said passage means, first electrical conductor means having first and second electrical conductor portions integrally formed with each other and extending through said internal body means as to have said first electrical conductor portion adapted for electrical connection to associated first electrical circuit means, electrical resistance means situated in said chamber-like portion, wherein the magnitude of the electrical resistance of said resistance means varies in response to temperature sensed by said electrical resistance means, wherein said second electrical conductor portion extends into said chamber-like portion and is electrically connected to one electrical side of said electrical resistance means, and second electrical conductor means having third and fourth electrical conductor portions integrally formed with each other and extending through said internal body means as to have said third electrical conductor portion adapted for electrical connection to associated second electrical circuit means and as to have said fourth electrical conductor portion extending into said chamber-like portion and electrically connected to a second electrical side of said electrical resistance means.

25. A thermal probe assembly according to claim 1 wherein said outer housing comprises at least first and second housing bodies secured to each other, wherein said at least first housing body is comprised of a first material, and wherein said at least second housing body is comprised of a second material which is different from said first material.

26. A thermal probe assembly according to claim 25 wherein each of said first and second conductors extend into both said first and second housing bodies.

27. A thermal probe assembly according to claim 25 wherein said mounting member is situated in said at least first housing body, and wherein said at least second housing body comprises at least a part of said probe portion.

28. A thermal probe assembly according to claim 27 wherein said at least first housing body is comprised of plastics material, and wherein said at least second housing body is comprised of metal.

29. A temperature responsive assembly according to claim 24 and further comprising sealing means, said sealing means being carried by said internal body means and effective for engaging the surface of said passage means, said sealing means being effective to create a seal extending from said internal body means to and against the surface of said passage means.

* * * * *

UNITED STATES PATENT AND TRADEMARK OFFICE
CERTIFICATE OF CORRECTION

PATENT NO. : 5,949,324
DATED : Sept. 7, 1999
INVENTOR(S) : John M. Segler et al It is certified that error appears in the above-identified patent and that said Letters Patent is hereby corrected as shown below:

Column 1, lines 61 and 62, after "directed" delete the period (.) and delete "The" and substitute therefor ---- to the ----.

Column 6, line 59, delete "EL" and substitute therefor ---- a ----.

Column 10, line 14, change "284" to ---- 294 ----.

Signed and Sealed this

Twenty-ninth Day of February, 2000

Attest:

Q. TODD DICKINSON

Attesting Officer      *Commissioner of Patents and Trademarks*